INVENTORS
GERALD D. HARRINGTON
HENRY G. SHAKESPEARE
BY
Gordon H. Aueschen
ATTORNEY

INVENTORS
GERALD D. HARRINGTON
HENRY G. SHAKESPEARE

ATTORNEY

United States Patent Office 3,298,628
Patented Jan. 17, 1967

3,298,628
CLOSED-FACE SPINNING REEL HAVING IMPROVED PUSH-BUTTON LINE RELEASE
Gerald D. Harrington and Henry G. Shakespeare, Kalamazoo, Mich., assignors to Shakespeare Company, Kalamazoo, Mich., a corporation of Michigan
Filed Oct. 22, 1963, Ser. No. 317,956
1 Claim. (Cl. 242—84.2)

The present invention relates to spinning reels of the closed-face type and is more particularly concerned with a novel pushbutton release mechanism, which provides better control of the line during the casting operation, and with spinning reels embodying the same.

Spinning reels have in recent years achieved wide popularity because of their many advantages over traditional bait-casting reels utilizing a reel rotatable about an axis perpendicular to the direction in which the line is cast. Spinning reels avoid such difficulties as backlash and line snarling, which are normally encountered with casting reels by all but the expert fisherman. Additionally, because there is no reel inertia to overcome during casting, even a novice may make long and accurate casts with a minimum of practice or instruction.

Earlier spinning reels have been of the open-face type utilizing a retractable finger or bail to retrieve the line after casting. More recently the close-face type of spinning reel has attained prominence and even surpassed the open-face reel in popularity. There are several reasons for this popularity. First, the closed face reel releases the line through an eyelet provided at the apex of a generally conical forward face, thus reducing the amplitude of vibration of the line and permitting the reel to be mounted close to the fishing rod handle. This also enables the spinning reel to be utilized in conjuction with the ordinary bait-casting rod. Moreover, the placement of the reel close to the rod permits push-button thumb control to be utilized for snubbing and releasing the line during casting.

Line pick up in a closed-face spinning reel is generally accomplished by one of two general types of structures. In one structure a pin or finger, mounted on a rotatable pick-up drum, is retractable below the outer rim of the drum for paying out line during casting. When the drum is rotated by the crank and gear arrangement, the pin or finger is extended through the rim of the drum by a cam arrangement and engages the line. The line is thus wound upon a stationary spool.

The other commonly used arrangement for line pick up is a pick-up member in the form of a rotatable cup having teeth or notches at its lip. When the teeth or notches are exposed, the line is engaged and wound on a stationary reel. Prior to casting, the cup is moved axially forward to a position where the pick-up is enclosed within another cup having a smooth lip which takes over control of the line and permits it to be freely payed out. In an alternate arrangement, shallow notches provided in the rim of the pick-up cup engage the line only when cooperating with an annular groove which substantially surrounds the lip. When the cup is moved axially away from the annular groove, the notches are no longer able to control the line and the line freely spins off the reel.

In the case of both types of line pick-up arrangement, release of the line for casting or for pay out is accomplished by moving the pick-up member axially forward. The axial movement is also used for a second purpose. By advancing the pick-up device forward beyond the point at which release takes place, the forward portion engages the front face of the reel cover, snubbing the line between the front face and the pick-up member, thus securing the line until it is released at the end of the casting motion by permitting the pick-up member to move rearwardly.

The axial movement of the pick-up member is almost universally controlled by a thumb push-button arrangement. In prior art devices, the push button is directly coupled to the main shaft and requires a movement of the thumb through substantially the same distance as the movement of the pick-up member. Because a considerable movement is thus necessary, the caster does not have as precise control over the cast as would be desirable. This is particularly the case since a time interval lag of only a fraction of a second results in a casting error of many feet.

It is accordingly an object of the present invention to provide a push-button mechanism for providing forward axial movement of the main shaft and line pick-up member of a closed-face spinning reel for the purpose of actuating the pick-up member to the condition in which line pay out occurs. It is a further object to provide such a push-button mechanism which may be used for snubbing and retaining the line during the first stages of a cast. It is a principal object of the invention to provide such a push-button mechanism whereby a small movement of the push-button results in a substantially larger movement of the line pick-up member. It is a still further object to provide a mechanism of the type described which is simple and which may be inexpensively manufactured. Another object is the provision of spinning reels embodying such improved pick-up mechanism. Additional objects will be apparent to one skilled in the art and still other objects will became apparent hereinafter.

Reference is now made to the accompanying drawings for a better understanding of the invention, wherein all the parts are numbered and wherein the same numbers are used to refer to corresponding parts throughout.

Figure 1:
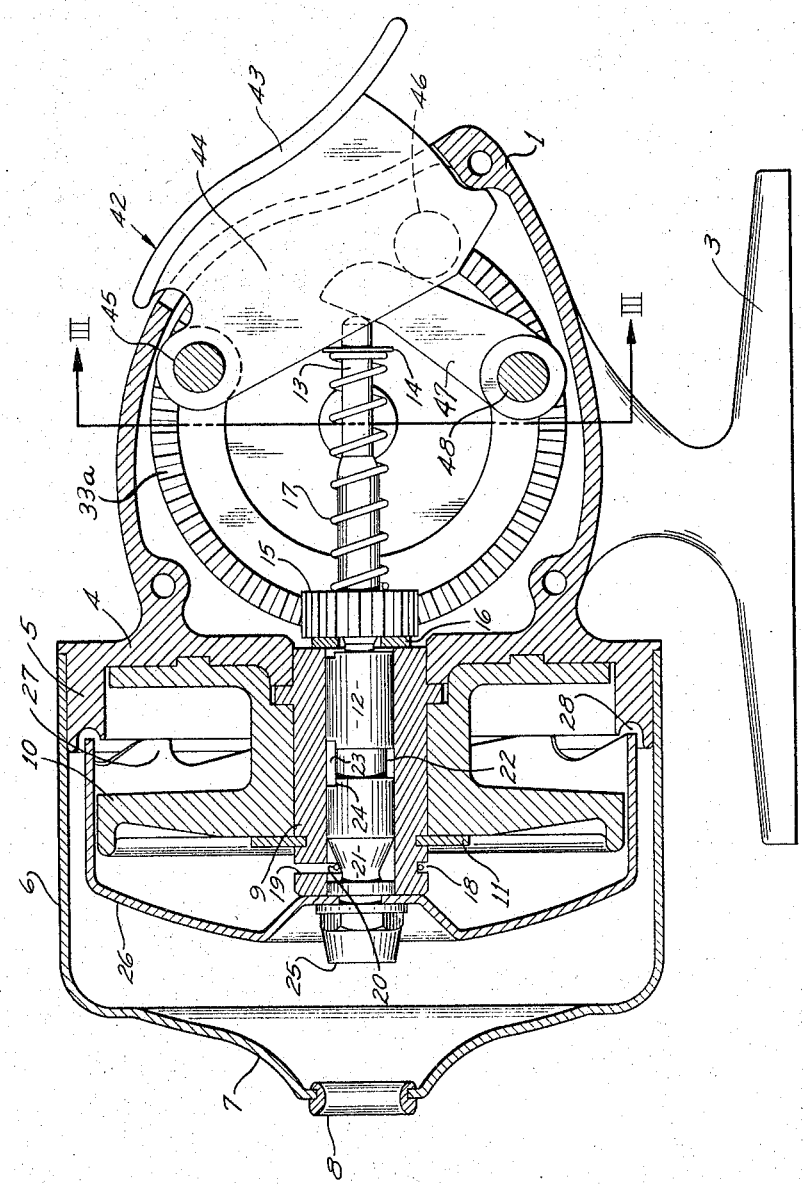
FIGURE 1 is a vertical sectional view in the plane of the axis of the reel of the present invention.
Figure 2:
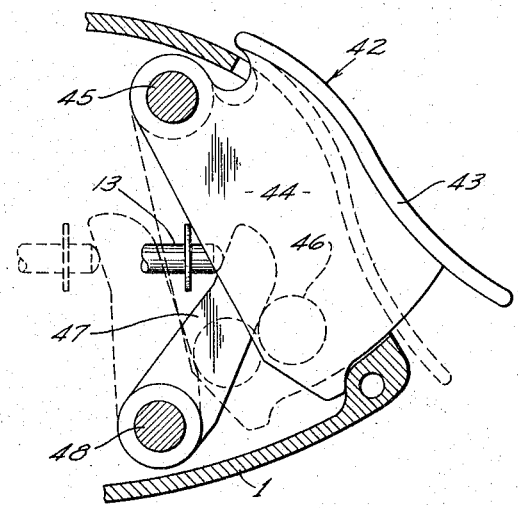
FIGURE 2 is a fragmentary elevational view illustrating the push-button mechanism of the reel shown in FIGURE 1, the mechanism being shown in two positions.
Figure 3:
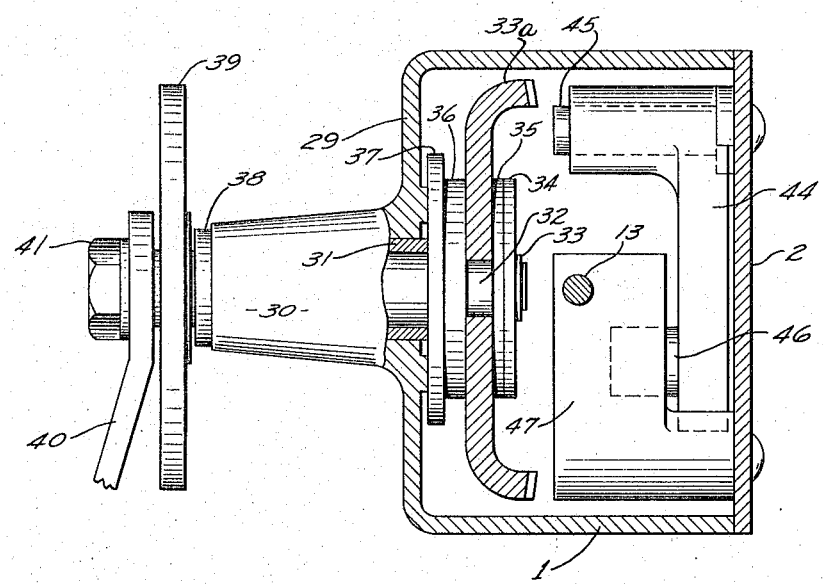
FIGURE 3 is a partial cross-sectional view taken at the line III—III of FIGURE 1.

Referring to FIGURES 1-3, the reel comprises a gear housing 1 having a removable cover plate 2. A reel seat 3 is integrally molded together with the gear housing 1. The front wall 4 of the gear housing has a forwardly projecting flange-like head portion 5 which may be peripherally threaded to receive the edge of a cap member 6. Where threads are provided on the head portion 5, the edge of the cap may be provided with complementary threads to be screwed thereover. Alternatively, the cap may be slidably mounted over the flange-like head portion 5. The cap member 6 has a conical portion 7 provided with a line-guide eye 8 at the apex thereof.

A main bearing 9 is fixedly positioned with regard to front wall 4 by means of an axial bore provided therefor. Mounted over the main bearing 9 is a stationary thread or line spool 10 which is maintained in place by a snap ring 11.

A main shaft 12 is journalled through the bore of the main bearing 9 and is free both to rotate and to travel axially. At the reduced end 13 of the main shaft 12 is a snap ring 14 maintained in a groove provided therefor. A pinion gear 15 is slidably mounted over a portion of the main shaft having a square cross section. The bore of the pinion gear has a complementary square cross section so that it may be driven by the main shaft, but yet is free to move axially with respect thereto. A washer 16 serves to space the pinion gear 15 and the main bearing 9. A helical compression spring 17 engaging the pinion gear 15 at one end and the snap ring 14 at the other provides a rearward biasing force for the main shaft 12.

At the forward end of the main bearing 9, an annular groove 18 is provided at one side with a notch 19 communicating with the bore of the main bearing 9 at the other side. A circular detent spring 20 rides in the circumferential groove 18 in a radially inward biased state. The main shaft 12 is provided with a cam taper 21 designed to expand the spring 20 when the main shaft is advanced forward axially. The main shaft 12 is also provided with a detent notch 22 which is engaged by the detent spring 20 when the main shaft 12 is pushed forward axially. As a result the main shaft is retained in a forward position. A cam notch 23 is also provided, forming a step with the detent notch. As a result of this structure, when the main shaft is in the forward position and is retained by the spring 20, rotation of the main shaft causes the step 24 to provide a cam action for the spring 20 and spread it open, releasing the main shaft and permitting the spring 17 to return it to its normal position.

Affixed to the end of the main shaft 12 by means of a nut 25 is a cup-form line pick-up member 26, the lip of which is provided with a plurality of line pick-up teeth 27. An annular groove 28 is provided at the forward edge of the head portion 5 which cooperates with the toothed edge of the pick-up member 26 to pick up the line and wind it on the spool 10 when the pick-up member is rotated. This occurs only when the pick-up member 26 is in its rearwardmost position. When the main shaft 12 is moved forward to the position where it is retained by the detent spring 20, the line slides over the pick-up teeth 27 and is thus free to pay out, as during a cast or otherwise.

Mounted on a side wall 29 of the gear housing is a crank shaft housing 30 in which is rotatably journalled a sleeve 31. Within the sleeve is journalled a crank shaft 32 having a snap ring 33 affixed to one end thereof. Mounted over the crank shaft is a combination assembly comprised of a beveled driving gear 33a and an adjustable drag assembly. The beveled driving gear 33a is arranged to mesh with the pinion gear 15. The adjustable drag assembly is comprised of a rigid washer 34, friction disks 35 and 36 which may be of any suitable friction material, and a rigid retaining disk 37. The sleeve 31 is provided with a flange 38 to retain it in position. Mounted over a threaded portion of the crank shaft is a drag adjusting wheel 39. As the wheel 39 is tightened, the gear 33a is compressed between the friction disks 35 and 36. When the force caused by a pull on the line is greater than the friction established by the assembly, the gear 33a slides or rotates even though the crank shaft is maintained in a stationary position, thus permitting the line to pay out. A crank 40 is affixed to a reduced and threaded end of the crank shaft by means of a nut 41.

The structure thus far described is conventional in the art and forms no part of the present invention. The invention is concerned primarily with an arrangement by which the main shaft 12 together with the line pick-up member 26 may be moved axially from their rearward-most position to their forward-most position with only a small movement of the thumb. The structure is shown in detail in FIGURE 2, the rearward-most position being shown by a solid line and the forward-most position by a broken line. The structure comprises a thumb push-button lever 42 having a curved flange 43 and a web 44. The push-button lever 42 pivots on a pillar 45 mounted on the cover plate 2. Affixed to the flange 44 is a boss or pin 46. A lever arm 47 is pivotally mounted on a pillar 48, also affixed to the cover plate 2. The assembly is so arranged that the free end of the lever arm 47 operatively engages the end of the shaft. The boss 46 is so positioned that when the push-button lever 42 is depressed, it engages the lever arm at a point intermediate of the point at which the lever arm engages the end of the main shaft and at the point at which it pivots. The result is a gain in motion. For example, if the boss is positioned to engage the lever arm midway between its pivot point and its point of engagement with the main shaft, a movement of one-eighth inch of the push-button lever results in a movement of one-quarter inch of the main shaft. By placing the boss closer to the pivot point, even greater motion advantages may be obtained. However, as the motion advantages increases, the force required to move the main shaft increases, according to well known lever principles. Consequently, there is a point beyond which the advantage gained in motion may not be sufficient to compensate for the increased force required. A preferred range for the ratio of the distance from the pivot point of the lever arm to the point of engagement with the shaft to the distance from said pivot point to the point of engagement with said push-button lever means, and correspondingly for the ratio between main shaft movement and push-button lever movement, is in the range of about 1.1 to 1 to about 2 to 1. A ratio of about 1.1 to 1.5 to 1, and especially about 1⅜ to 1, has been found to be optimum. Other ratios may be used if desirable in a particular reel construction.

Normally the arrangement is that shown in FIGURE 1 with the pick-up member 26 engaging the line. In order to cast, the push-button lever 42 is depressed. This results in the main shaft and the pick-up member being moved forward axially until the forward edge of the pick-up member engages the forward wall of the cap 6 and snubs the line therebetween. As a result, the line is secured. A cast is then made, at the end of which the push-button lever 42 is released. The pick-up member returns to its intermediate position in which the detent groove 22 is engaged by the detent spring 20. In this position the line is released and is free to be payed out, since the teeth 27 are not in engagement with the annular groove 28. The length of the cast may be terminated by once again depressing the push button 42 and snubbing the line. In order to retrieve the line, the crank is is turned, expanding the detent spring 20 and permitting the pick up member 26 to return to its normal pick-up position with teeth 27 in groove 28 as shown in FIGURE 1.

Figure 4:
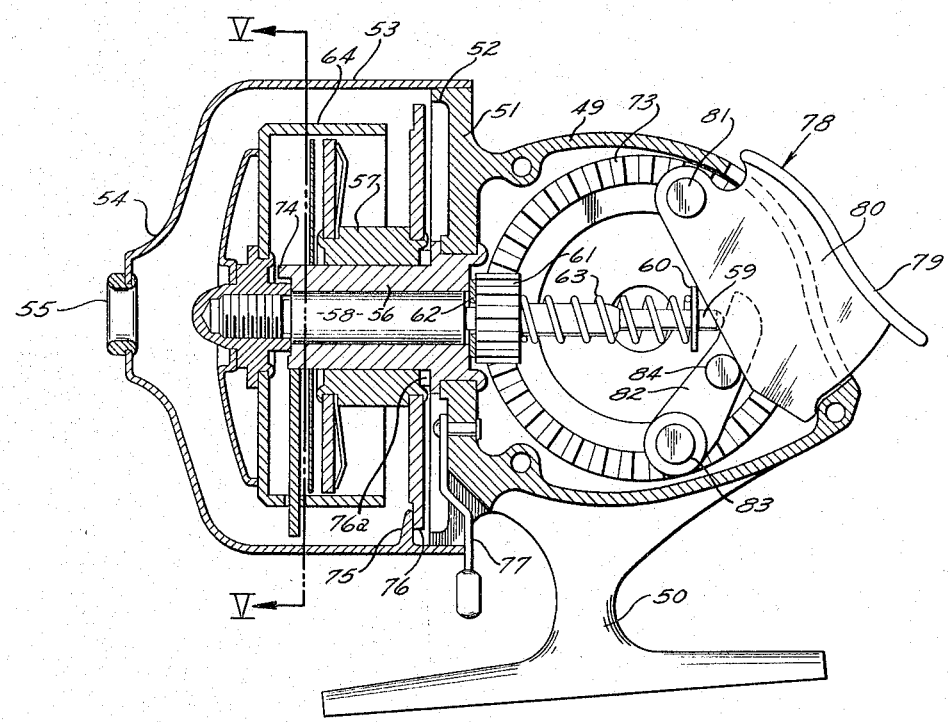
FIGURE 4 is a vertical sectional view in the plane of the reel axis showing a reel in somewhat modified form.
Figure 5:
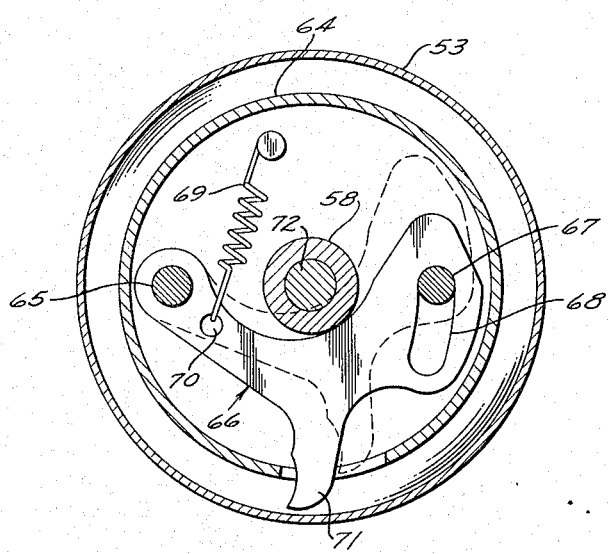
FIGURE 5 is a cross-sectional view taken at the line V—V of FIGURE 4.

FIGURES 4 and 5 show a spinning reel utilizing a pin or finger type of pick up, in order to illustrate the adaptability of the present invention to all types of spinning reels in which an axial movement of the pick-up member is utilized for releasing and retrieving the line as well as for snubbing the line to secure it temporarily during a cast.

The external structure of the reel shown in FIGURES 4 and 5 is similar to that of the reel previously described. It comprises a gear housing 49 and a pair of removable cover plates, not shown. A reel seat 50 is integral with the gear housing 49. The front wall 51 contains a threaded flange 52. A cap 53 is screwably mounted on the flange 52. The cap comprises a conical portion 54 having a line-guide eye 55 at the apex thereof. A main bearing 56 is affixed to the front wall 51. A line spool 57 is mounted coaxially over the main bearing. A main shaft 58 is journaled in the main bearing 56 and is free to rotate and slide axially therein. The reduced end 59 of the main shaft 58 has a snap ring 60 contained in a groove therein. A pinion gear 61 is mounted over a portion of the main shaft having a square cross section, the pinion gear having a complementary cross-sectional bore and being free to slide axially thereon while being driven by said main shaft. A washer 62 spaces the pinion gear 61 from the main bearing 56.

Affixed to the forward end of the main shaft is a rotatable line pick-up member 64. Pivotally mounted within the pick-up member about a pillar 65 is a pick-up arm 66. Pivotal movement is restricted by means of a pin 67 affixed to the pick-up member 64. The pick-up arm 66 is provided with an arcuate groove 68 in which the pin 67 rides. A spring 69 anchored at one end to the pick-up member 64 is attached to the pick-up arm through a hole 70 provided therein, and provides a biasing force urging the pick-up arm against the outer wall of the main bearing 56. In this position, as shown by the solid lines in FIGURE 5, the pick-up finger 71 extends through a hole in the pick-up member and engages the line. Prior to casting, the main shaft is pushed forward axially, also moving the pick-up member forward. As a consequence, the pick-up arm falls off the cam edge of the main bearing 56 and comes to rest on a small diameter 72 of the main shaft, as a result of the bias provided by the spring 69. The pick-up arm is detained by the shoulder at the end of the main bearing and prevents the main shaft and pick-up member from returning to its normal position. When the main shaft and pick-up member are rotated by means of a crank, not shown, coupled through a shaft, also not shown, to the beveled driving gear 73, the pick-up arm 66 encounters a cam projection 74 of the main bearing 56 and is thereby lifted to ride once again on the outer cam surface of the main bearing 56, extending the pick-up finger 71, and releasing the main shaft and pick-up member to return to their normal position.

In the embodiments shown in FIGURES 4 and 5, adjustable drag is provided by means of a flange 75 provided on the cap member 53 which engages the rear wall 76 of the line reel and forces it rearwardly where the back of the reel frictionally engages a friction washer 76a. Drag is increased by screwing the cap on a greater distance. The cap is maintained in position by means of a wire spring 77.

The novel structure of the invention for providing axial movement of the main shaft is similar to that shown in FIGURES 1, 2 and 3. A thumb push-button lever 78 having a curved flange 79 and a web 80 is pivoted about a pillar 81. A lever arm 82 is pivotally mounted on a pillar 83. A boss or pin 84 is mounted on the lever arm 82 at a point intermediate its point of application against the end of the main shaft and its pivot point, in such a manner as to be engaged by the web of the push-button lever. As a result of this structure, a small movement of the push-button lever causes the main shaft and pick-up member to move forward over a relatively large distance and to snub the line against the cap member, while causing the pick-up finger to recede into the pick-up member. As a result, when the cast is made and the thumb released, the pick-up member is restrained in the position where the line may be freely payed out. When it is desired to terminate the cast, a small movement of the thumb again snubs the line to stop the forward movement of the lure. Rotation of the pick-up member by means of the crank once again releases the main shaft and pick-up member to return to their normal positions for retrieving the line.

As shown in the drawings, the push-button lever is pivoted at or toward the top of the gear housing, and the lever arm is pivoted at or toward the bottom of the gear housing. This is a superior arrangement since it permits a much more compact structure to be utilized than if the push-button lever and the lever arm are pivoted in the same part of the gear housing. Moreover, because of the positioning of the two parts, there is very little sliding friction between the push-button lever, the lever arm, and the shaft which would increase resistance to movement, as would be true of a structure where the pivot points of the two lever members were on the same side of the main shaft.

Many variations may be made in the invention. For example, instead of affixing the boss to the web as shown in FIGURES 1, 2 and 3, the boss may be affixed to the lever arm, as shown in FIGURE 4. The web then engages the boss to actuate the lever arm. The boss structure may be of many forms such as pins or other lateral extensions.

The reel itself may be modified in various ways without affecting the inventive concept of the structure as shown. For example, ratchet means may be provided in many forms to restrain rotation of the reel or pick-up member in one direction. Various forms of adjustable drag may be provided. Moreover, various means for picking up the line may be utilized. However, the present invention is useful in conjunction with all types of spinning reels where axial movement of the main shaft is required for engaging and releasing the line or retaining the line during the casting operation.

It is thus seen that a new and efficient push-button release mechanism, and spinning reels containing the same, are hereby provided, whereby all of the aforesaid objectives of the invention are accomplished.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claim.

We claim:

In a spinning reel comprising a housing, a shaft mounted rotatably in said housing and being axially movable and spring-biased axially rearwardly, means for rotating said shaft, a normally stationary line spool coaxially mounted about said shaft, and line pickup means affixed to said shaft, the improvement which comprises: means for providing forward axial movement of said shaft comprising a push-button lever means pivotally mounted toward the top of said housing comprising an externally positioned push button and an internally positioned lever portion extending downwardly below the rear end of said shaft, a lever arm pivotally mounted at one end toward the bottom of said housing and having its other end directed upwardly for operatively engaging the rear end of said shaft, means on one of (a) said push-button lever means and (b) said lever arm for providing engagement with the other so arranged that said lever arm is engaged by said push-button lever means at a point intermediate the pivot point of said lever arm and its point of engagement with the end of said shaft, wherein the ratio of the distance from the pivot point of said lever arm to the point of engagement with said shaft to the distance from said pivot point to the point of engagement with said push-button lever means is in the range of about 1.1 to 1 to about 2 to 1, whereby forward axial movement of said shaft is provided by a smaller movement of said push button lever means.

References Cited by the Examiner

UNITED STATES PATENTS

| | | | |
|---|---|---|---|
| 2,613,468 | 10/1952 | Hand | 242—84.2 |
| 3,000,586 | 9/1961 | Mandolf | 242—84.2 |
| 3,025,020 | 3/1962 | Sarah | 242—84.21 X |
| 3,074,664 | 1/1963 | Beger | 242—84.2 |

FRANK J. COHEN, *Primary Examiner.*

MERVIN STEIN, *Examiner.*

B. S. TAYLOR, *Assistant Examiner.*